(12) United States Patent
Hong et al.

(10) Patent No.: US 7,489,501 B2
(45) Date of Patent: Feb. 10, 2009

(54) MOUNTING APPARATUS WITH A SLIDING BRACKET FOR LCD PANEL

(75) Inventors: Lin-Yun Hong, Shenzhen (CN); Yong Yue, Shenzhen (CN); Hsuan-Chen Chen, Taipei Hsien (TW); Chien-Li Tsai, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 187 days.

(21) Appl. No.: 11/614,998

(22) Filed: Dec. 22, 2006

(65) Prior Publication Data

US 2007/0263347 A1 Nov. 15, 2007

(30) Foreign Application Priority Data

May 12, 2006 (CN) .................. 200620013931.6

(51) Int. Cl.
*H05K 5/00* (2006.01)

(52) U.S. Cl. .................................................. 361/681

(58) Field of Classification Search ................ 361/681, 361/682, 683; 345/905; 248/917; 40/530
See application file for complete search history.

(56) References Cited

U.S. PATENT DOCUMENTS

| 5,422,751 | A | | 6/1995 | Lewis et al. | |
|---|---|---|---|---|---|
| 6,002,582 | A | * | 12/1999 | Yeager et al. | 361/681 |
| 6,046,785 | A | * | 4/2000 | Won | 349/58 |
| 6,064,565 | A | * | 5/2000 | Ishihara et al. | 361/681 |
| 6,392,723 | B1 | * | 5/2002 | Sugiyama et al. | 349/58 |
| 6,498,718 | B1 | * | 12/2002 | Kim et al. | 361/680 |
| 7,248,327 | B2 | * | 7/2007 | Ha et al. | 349/149 |
| 2007/0242182 | A1 | * | 10/2007 | Hong et al. | 349/58 |
| 2007/0253150 | A1 | * | 11/2007 | Yue et al. | 361/681 |

* cited by examiner

*Primary Examiner*—Chandrika Prasad
(74) *Attorney, Agent, or Firm*—Wei Te Chung (57) ABSTRACT

A mounting apparatus for liquid crystal display (LCD) panels is provided. The mounting apparatus includes a bezel, a fixing bracket, a fixing member, a sliding bracket, and a cover. The fixing bracket mounted to the bezel is configured to secure to a side of an LCD panel. The fixing member includes a fixing plate mounted to the bezel and a flange perpendicularly extending from an end edge of the fixing plate. The flange defines an elongated slot. The sliding bracket includes a tab slidable in the elongated slot. The sliding bracket slidable with respect to the fixing member is configured to secure to an opposite side of the LCD panel before being secured to the bezel. The cover is mounted to the bezel for enclosing the LCD panel therebetween.

18 Claims, 6 Drawing Sheets

MOUNTING APPARATUS WITH A SLIDING BRACKET FOR LCD PANEL

CROSS-REFERENCES TO RELATED APPLICATION

This application is related to a co-pending application entitled with "MOUNTING APPARATUS FOR LCD PANEL", (application Ser. No. 11/557,106) filed on 6, Nov. 2006, and assigned to the same assignee.

BACKGROUND OF THE INVENTION

1. Field of the Invention

The present invention relates to mounting apparatuses for mounting liquid crystal display (LCD) panels thereon, and particularly to a mounting apparatus which can be adjusted to mount different size LCD panels thereon.

2. Description of Related Art

Generally, in a portable computer, including but not limited to devices such as a notebook type personal computers, personal digital assistants (PDAs) and the like, a lid containing an LCD, which serves as a display unit to display a picture, is pivotably connected to a back end of a body. In the conventional portable computer, the lid with a certain width holds an LCD panel with a fixed corresponding width. However, the width of the LCD panel may be slightly different due to imperfections in the manufacturing process. When an LCD panel with a width slightly different to the fixed width is mounted to the lid, the fit may be forced possibly damaging the LCD panel.

What is needed, therefore, is a mounting apparatus which can adjustably receive different size LCD panels mounted thereon.

SUMMARY OF THE INVENTION

A mounting apparatus for liquid crystal display (LCD) panels is provided. In a preferred embodiment, the mounting apparatus includes a bezel, a fixing bracket, a fixing member, a sliding bracket, and a cover. The fixing bracket mounted to the bezel is configured to secure to a side of an LCD panel. The fixing member includes a fixing plate mounted to the bezel and a flange perpendicularly extending from an end edge of the fixing plate. The flange defines an elongated slot. The sliding bracket includes a tab slidable in the elongated slot. The sliding bracket slidable with respect to the fixing member is configured to secure to an opposite side of the LCD panel before being secured to the bezel. The cover is mounted to the bezel for enclosing the LCD panel therebetween.

Other objects, advantages and novel features of the present invention will become more apparent from the following detailed description of preferred embodiments when taken in conjunction with the accompanying drawings, in which:

DETAILED DESCRIPTION OF THE INVENTION

Figure 1:
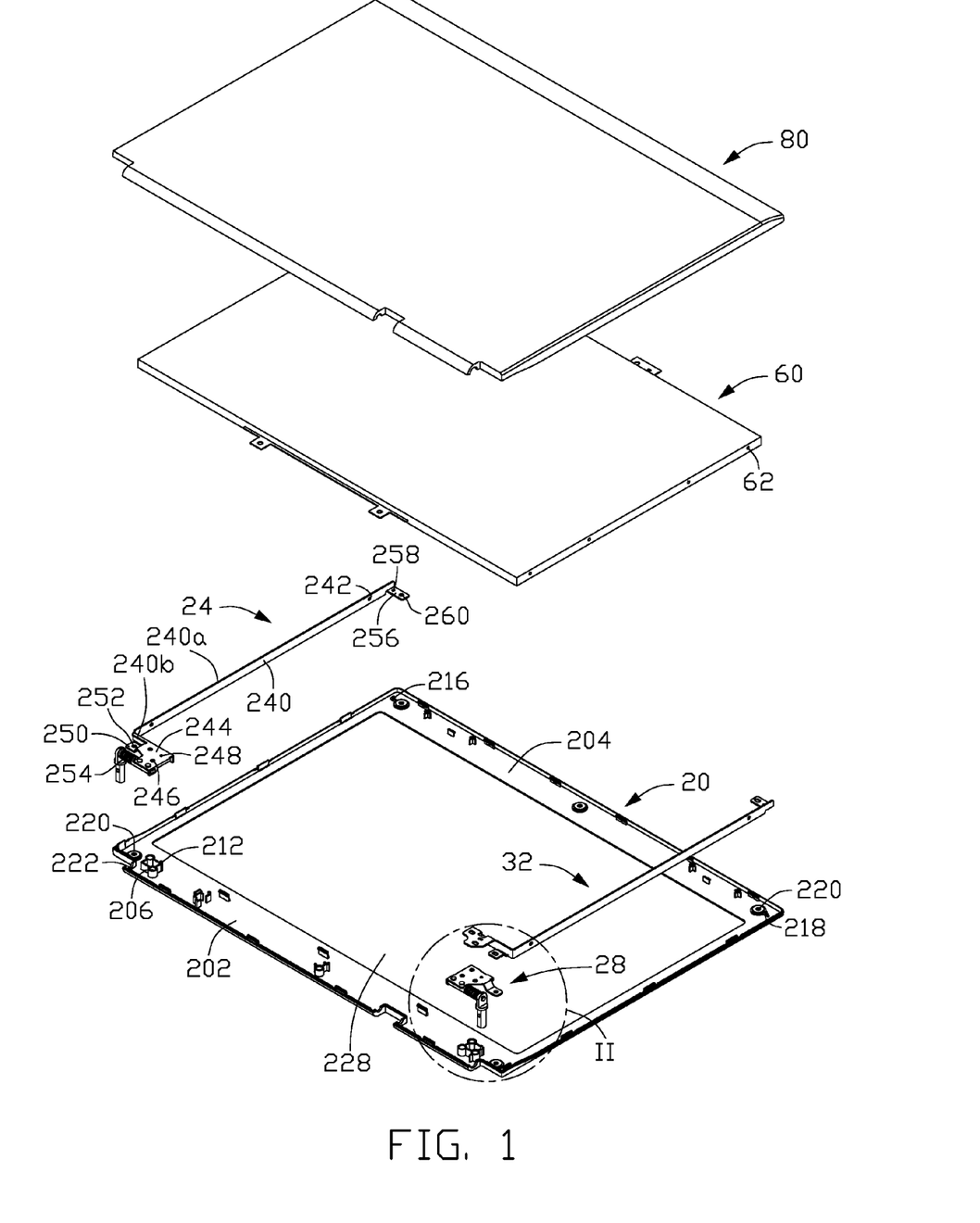
FIG. 1 is an exploded, isometric view of a mounting apparatus including a cover, a fixing member, and a sliding bracket, in accordance with a preferred embodiment of the present invention, together with an LCD panel.

Referring to FIG. 1, a mounting apparatus in accordance with a preferred embodiment of the present invention which can adjustably mount different size LCD panels thereon is shown. In this embodiment, the LCD panel is used for displaying alphanumeric or graphic computer data. The mounting apparatus includes a bezel 20, a cover 80, a fixing bracket 24, a fixing member 28, and a sliding bracket 32.

Figure 2:
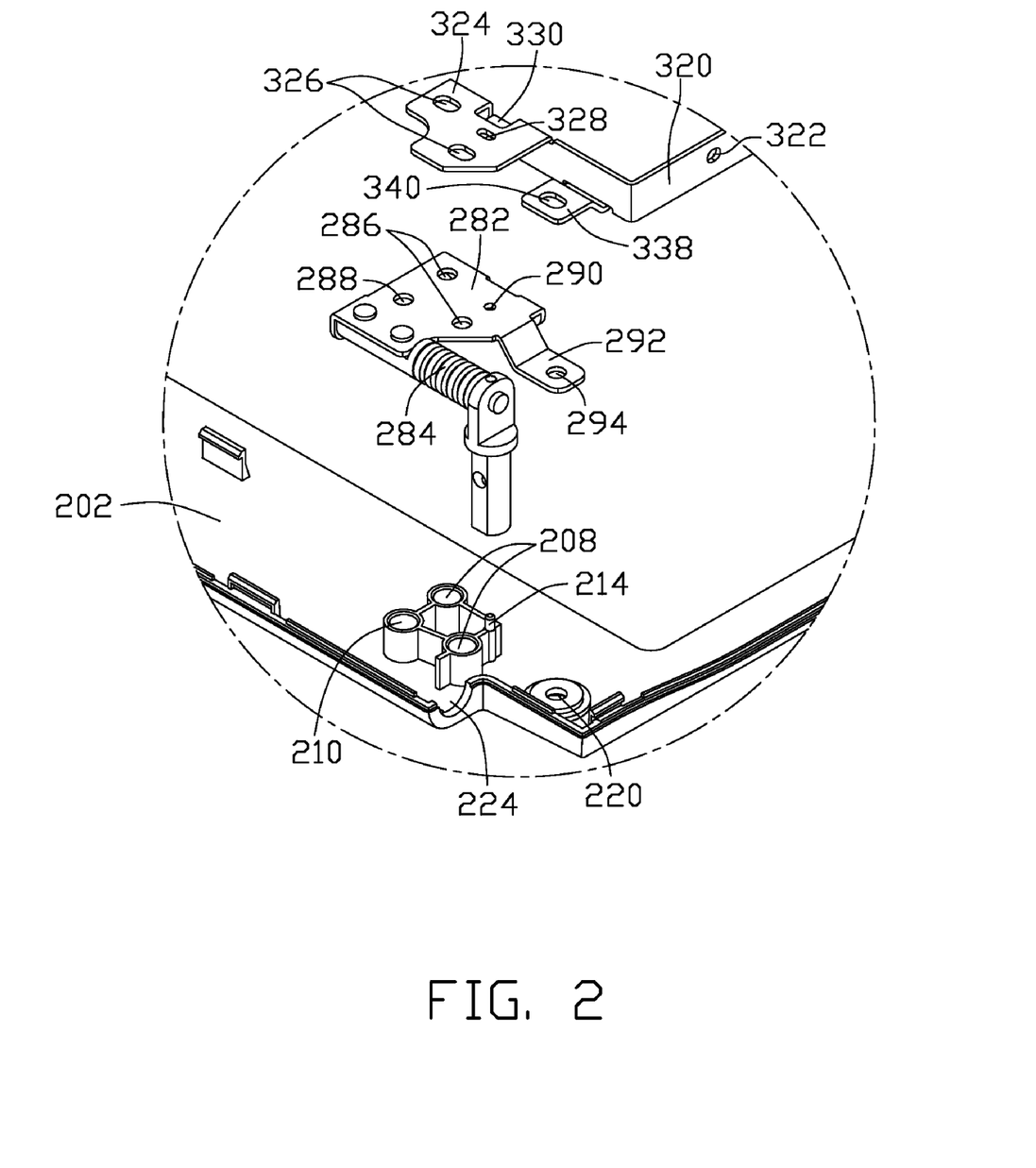
FIG. 2 is an enlarged view of a circled portion 11 of FIG. 1.

Referring also to FIG. 2, the bezel 20 includes two opposite sides 202, 204 and another opposite two sides respectively connecting free ends of the sides 202, 204. Two pairs of fixing posts 206, 208 extend up from the bezel 20 adjacent opposite ends of the side 202, respectively. A guiding protrusion 212 is formed adjacent the fixing posts 206. A guiding protrusion 214 and a guiding post 210 are formed adjacent the fixing posts 208. Fixing pins 216, 218 extend up from the bezel 20 at opposite ends of the side 204, respectively. The bezel 20 defines a through hole 220 at each of four corners thereof. The side 202 defines two notches 222, 224 at opposite ends thereof, respectively. An opening 228 is formed among the four sides of the bezel 20.

The fixing bracket 24 includes a body 240 in the form of an L-shaped configuration. A long portion 240a of the body 240 defines a pair of apertures 242 adjacent the opposite ends thereof. A fixing plate 244 extends from an upper side edge of a short portion 240b of the body 240. The fixing plate 244 defines a pair of fixing holes 246 corresponding to the fixing posts 206, and a guiding hole 248 corresponding to the guiding protrusion 212. A guiding plate 250 defining a through hole 252 extends from an end edge of the fixing plate 244. The fixing plate 244 includes a pivot portion 254. A flange 256 defining a guiding hole 258 and a through hole 260 extends from a lower side edge of a free end of the long portion 240a of the body 240.

Figure 3:
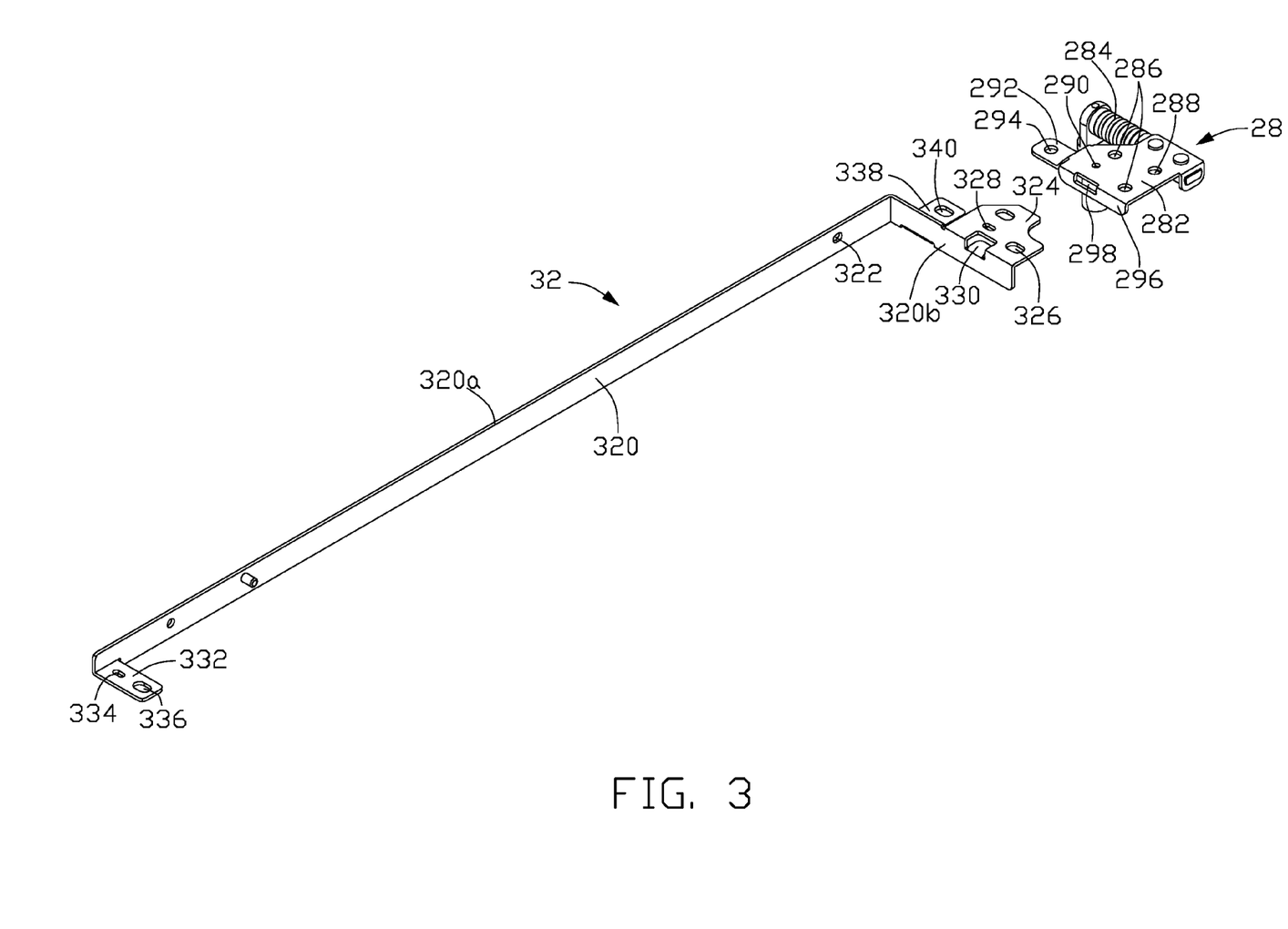
FIG. 3 is an isometric view of the fixing member and the sliding bracket of FIG. 1, but viewed from another aspect.

Referring also to FIG. 3, the fixing member 28 includes a fixing plate 282 and a pivot portion 284. The fixing plate 282 defines a fixing hole 286, a guiding hole 288, and a guiding hole 290. A guiding plate 292 defining a through hole 294 extends from an end edge of the fixing plate 282. A flange 296 defining an elongated slot 298 perpendicularly extends from another end edge of the fixing plate 282.

The sliding bracket 32 includes a body 320 in the form of an L-shaped configuration. A long portion 320a of the body 320 defines a pair of apertures 322 adjacent opposite ends thereof respectively. A fixing plate 324 defining a pair of elongated fixing holes 326 and an elongated guiding hole 328 extends perpendicularly from an upper side edge of a short portion 320b of the body 320. A tab 330 is punched generally downward from the fixing plate 324 with an end integral with the short portion 320b of the body 320. The tab 330 is below and parallel to the fixing plate 324. A guiding plate 338 defining an elongated through hole 340 extends from a lower side edge of the short portion 320b of the body 320. A flange 332 defining an elongated guiding hole 334 and an elongated through hole 336 extends from a lower side edge of a free end of the long portion of the body 320.

Figure 4:
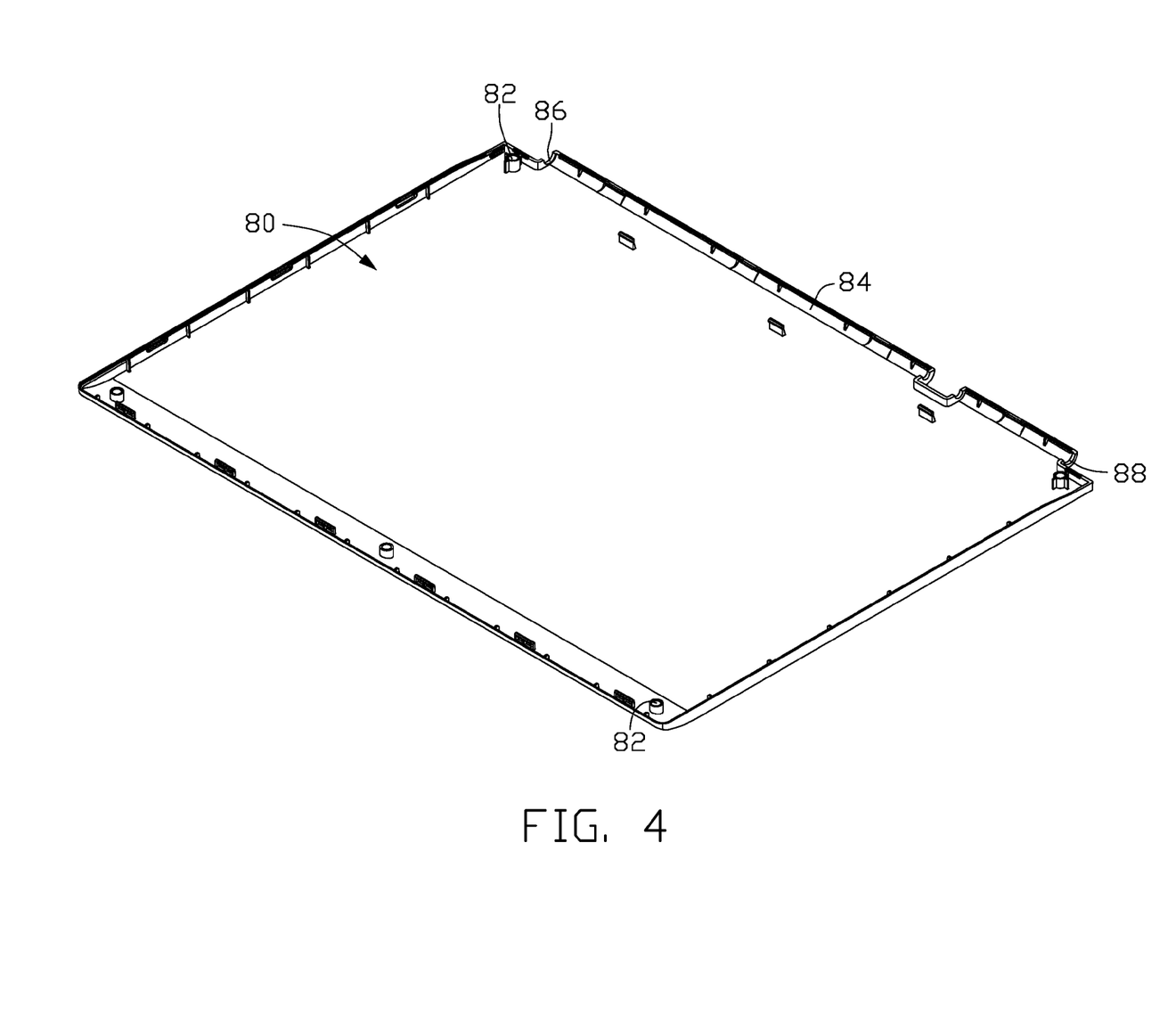
FIG. 4 is an inverted, isometric view of the cover of FIG. 1.

An LCD panel 60 for being mounted to the LCD panel mounting apparatus defines a pair of screw holes 62 in each of two opposite sides thereof. Referring also to FIG. 4, the cover 80 includes a locking post 82 defining a screw hole at each of four corners thereof. A side 84 of the cover 80 defines two notches 86, 88 at opposite ends thereof, respectively.

Figure 5:
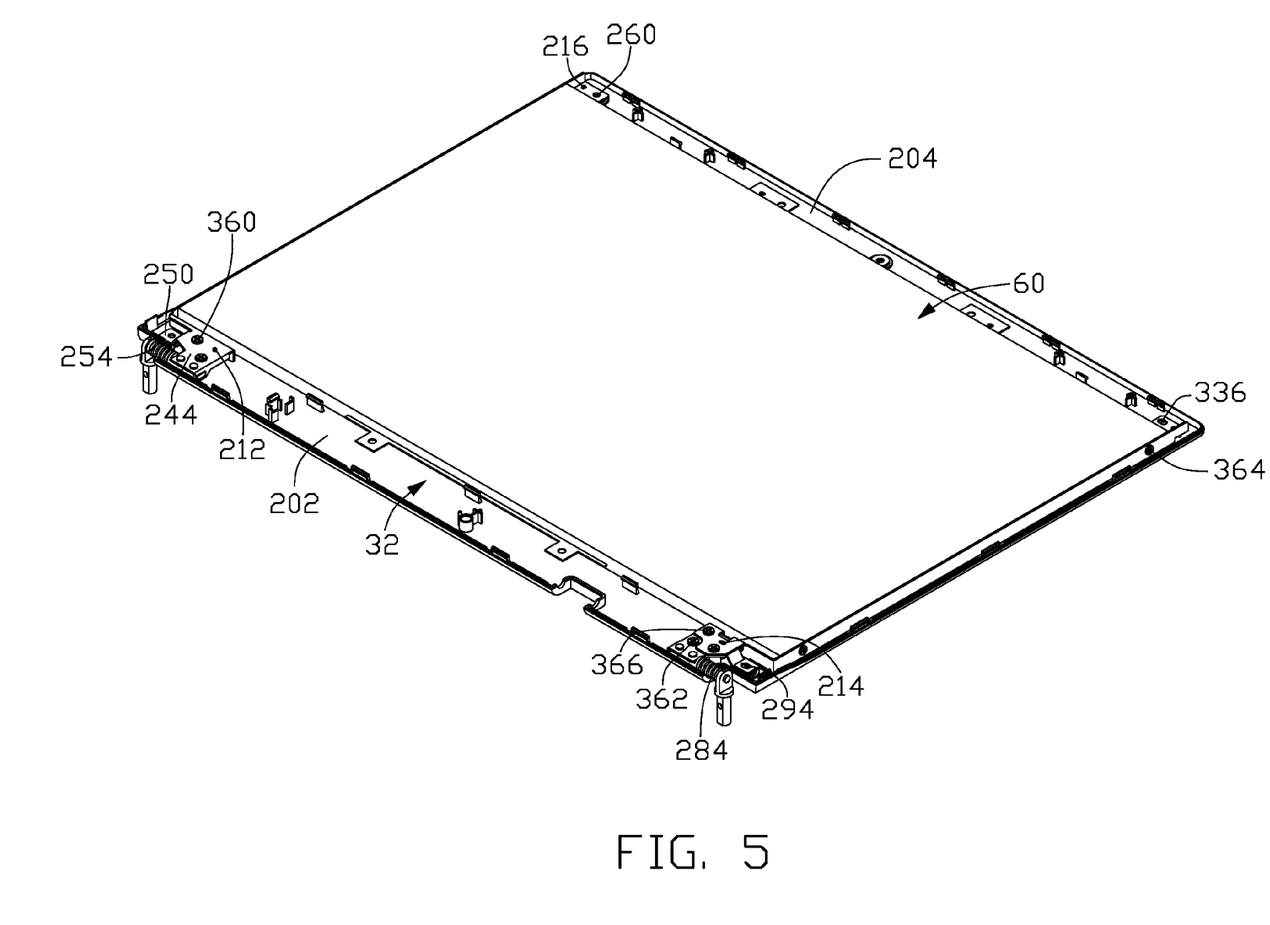
FIG. 5 is an assembled view of FIG. 1, without the cover.
Figure 6:
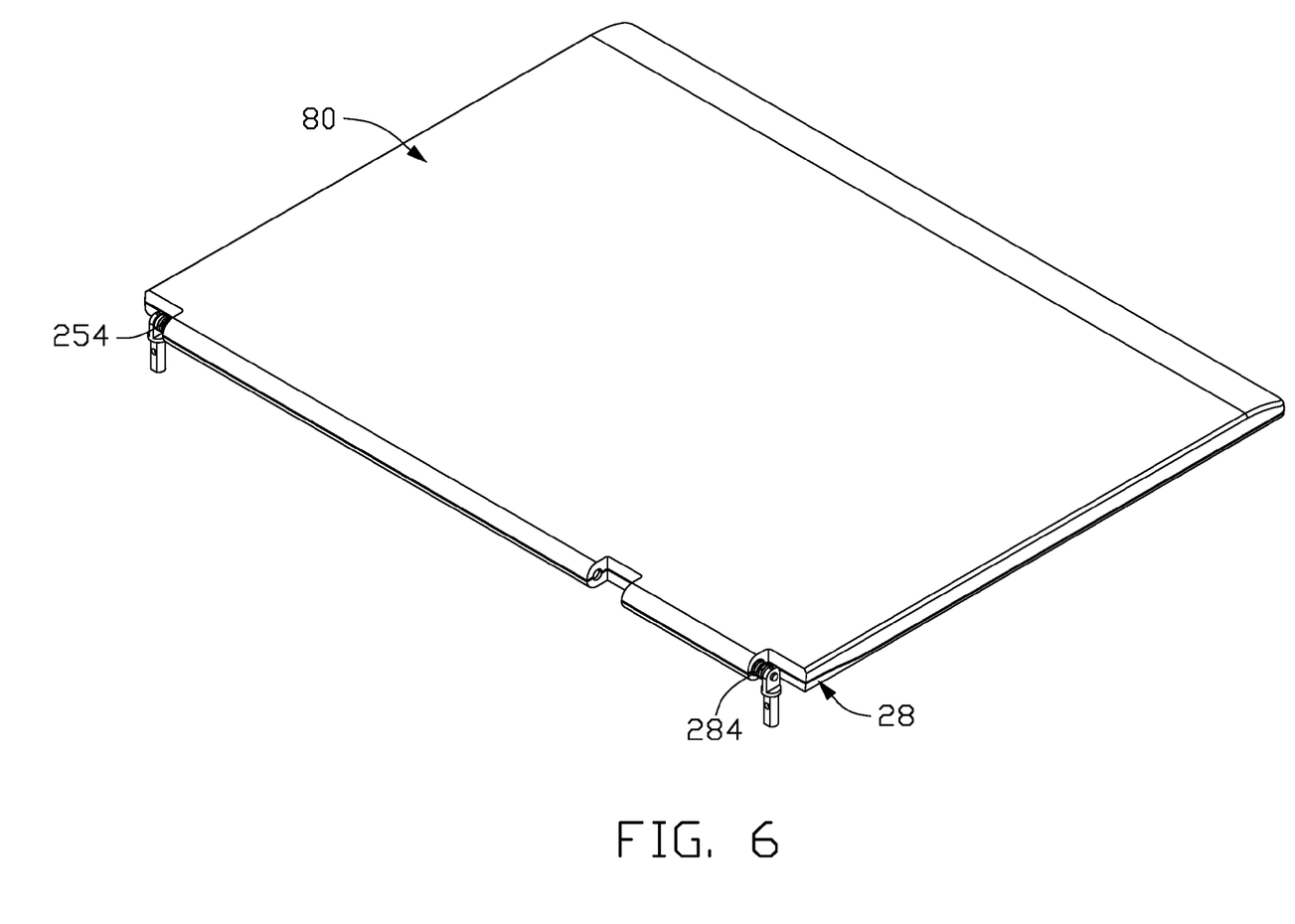
FIG. 6 is an assembled view of FIG. 1.

Referring also to FIGS. 5 and 6, in assembly, the fixing pin 216 and the guiding protrusion 212 of the bezel 20 respectively engage in the guiding holes 258, 248 of the fixing bracket 24, and a pair of screws 360 is inserted through the fixing holes 246 of the fixing bracket 24 to engage in the screw holes of the corresponding fixing posts 206. Thus, the fixing bracket 24 is mounted to the bezel 20. The tab 330 of the sliding bracket 32 engages in the elongated slot 298 of the fixing member 28. A screw 362 is inserted through the guiding hole 288 of the fixing member 28 to engage in a screw hole of the fixing post 210 of the bezel 20, for mounting the fixing member 28 to the bezel 20. The fixing pin 218 of the bezel 20 engages in the elongated guiding hole 334 of the sliding bracket 32. The guiding protrusion 214 of the bezel 20 engages in the guiding hole 290 of the fixing member 28 and the elongated guiding hole 328 of the sliding bracket 32 sequentially. The length of the elongated slot 298 of the fixing member 28 is greater than the length of the tab 330 of the sliding bracket 32. The sliding bracket 32 is therefore slidable with respect to the bezel 20 in a direction perpendicular to the long portion 320a. An adjustable receiving space is formed between the bezel 20, the fixing bracket 24 and the sliding bracket 32. The LCD panel 60 is accommodated in the receiving space via adjustment of the sliding bracket 32 to cause the receiving space to have a corresponding size as the LCD panel 60. Most of the LCD panel 60 is exposed in the opening 228 of the bezel 20. The LCD panel 60 is sandwiched between the long portion 240a of the fixing bracket 24 and the long portion 320a of the sliding bracket 32 in a first direction, and sandwiched between the short portion 240b of the fixing bracket 24, the short portion 320b of the sliding bracket 32, the flange 256 of the fixing bracket 24 and the flange 332 of the sliding bracket 32 in second direction. Two screws 364 are respectively inserted through the apertures 242 of the fixing bracket 24 to engage in the corresponding screw holes 62 of the LCD panel 60. Two screws 364 are respectively inserted through the apertures 322 of the sliding bracket 32 to engage in the corresponding screw holes 62 of the LCD panel 60. Two screws 366 are inserted through the fixing holes 326 of the sliding bracket 32 and the fixing holes 286 of the fixing member 28 sequentially to engage in the corresponding fixing posts 208 of the bezel 20, for fixing the sliding bracket 32 to the bezel 20. Four screws (not shown) are respectively inserted through the through holes 220 of the bezel 20, and sequentially respectively inserted through the through hole 252 of the fixing bracket 24, the through hole 294 of the fixing member 28, and the through hole 340 of the sliding bracket 32, the through hole 336 of the sliding bracket 32, and the through hole 260 of the fixing bracket 24 to engage in the corresponding locking posts 82 of the cover 80.

The notch 86 of the cover 80 and the notch 222 of the bezel 20 cooperatively form a first receiving space for receiving the pivot portion 254 of the fixing bracket 24. The notch 88 of the cover 80 and the notch 224 of the bezel 20 cooperatively form a second receiving space for receiving the pivot portion 284 of the fixing member 28. The pivot portions 254, 284 are pivotably coupled to a base of a notebook computer.

When the LCD panel 60 is in need of repair, the cover 80 is detached from the bezel 20 by unscrewing the corresponding screws. After that, the LCD panel 60 can be removed from the receiving space via unscrewing the screws 364, 366 and moving the sliding bracket 32 away from the fixing bracket 24 to readily release the LCD panel 60, without detaching the sliding bracket 32 from the bezel 20.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A mounting apparatus for liquid crystal display (LCD) panels, the mounting apparatus comprising:
    a bezel;
    a fixing bracket mounted to the bezel configured for securing a side of an LCD panel;
    a fixing member comprising a fixing plate mounted to the bezel and a flange perpendicularly extending from an end edge of the fixing plate, the flange defining an elongated slot;
    a sliding bracket configured for securing an opposite side of the LCD panel, the sliding bracket comprising a tab being slidable in the elongated slot so that the sliding bracket is slidable with respect to the fixing member; and
    a cover mounted to the bezel for fixing the LCD panel therebetween.

2. The mounting apparatus as claimed in claim 1, wherein the sliding bracket further comprises a fixing plate laid over the tab, the bezel comprises a guiding protrusion, the fixing plate of the sliding bracket and the fixing plate of the fixing member respectively defines an elongated guiding hole and a guiding hole, the guiding protrusion of the bezel engages in the guiding hole of the fixing member and the elongated guiding hole of the sliding bracket sequentially after the tab engages in the elongated slot of the sliding bracket.

3. The mounting apparatus as claimed in claim 2, wherein the fixing plates of the sliding bracket and the fixing member respectively defines two fixing holes, the bezel comprises two fixing posts, two screws are inserted through the fixing holes of the sliding bracket and the fixing holes of the fixing member sequentially to engage in the corresponding fixing posts of the bezel, for fixing the sliding bracket to the bezel.

4. The mounting apparatus as claimed in claim 1, wherein the sliding bracket comprises a flange defining an elongated guiding hole, the bezel comprises a fixing pin, the fixing pin of the bezel engages in the elongated guiding hole of the sliding bracket after the tab engages in the elongated slot of the sliding bracket.

5. The mounting apparatus as claimed in claim 4, wherein the flange of the sliding bracket and the bezel respectively defines a through hole, the cover comprises a locking post, a screw is inserted through the through hole of the bezel and the through hole of the sliding bracket sequentially to engage in the locking post of the cover.

6. The mounting apparatus as claimed in claim 1, wherein the bezel comprises a fixing post, the fixing plate of the fixing member defines a guiding hole, a screw is inserted through the guiding hole of the fixing plate of the fixing member to engage in a screw hole of the fixing post of the bezel, for mounting the fixing member to the bezel.

7. The mounting apparatus as claimed in claim 1, wherein the fixing member and the fixing bracket respectively comprises a pivot portion, the cover and bezel respectively defines two notches, the notches of the cover and the notches of the bezel cooperatively form receiving spaces for receiving the pivot portions.

8. The mounting apparatus as claimed in claim 1, wherein the fixing bracket defines a pair of fixing holes, the bezel comprises a pair of fixing posts, a pair of screws is inserted through the fixing holes of the fixing bracket to engage in screw holes of the corresponding fixing posts of the bezel, for mounting the fixing bracket to the bezel.

9. The mounting apparatus as claimed in claim 1, wherein the fixing bracket and the sliding bracket respectively defines two apertures, two opposite sides of the LCD panel respectively define two screw holes, four screws are respectively inserted through the apertures of the fixing bracket and the sliding bracket to engage in the corresponding screw holes of the LCD panel.

10. A liquid crystal display (LCD) device, comprising:
a bezel defining an opening;
a fixing bracket mounted to the bezel adjacent a side of the opening;
a fixing member comprising a fixing plate mounted to the bezel adjacent an opposite side of the opening and a flange perpendicularly extending from an end edge of the fixing plate, the flange defining an elongated slot;
a sliding bracket comprising a tab slidable in the elongated slot in the flange of the fixing member, the sliding bracket being slidably coupled to the fixing member to form an adjustable receiving space between the fixing bracket and the sliding bracket;
an LCD panel received in the space and comprising a side mounted to the fixing bracket, and an opposite side mounted to the sliding bracket and being exposed via the opening; and
a cover covering the bezel.

11. The LCD device as claimed in claim 10, wherein the sliding bracket further comprises a fixing plate laid over the tab, the bezel comprises a guiding protrusion, the fixing plate of the sliding bracket and the fixing plate of the fixing member respectively defines an elongated guiding hole and a guiding hole, the guiding protrusion of the bezel engages in the guiding hole of the fixing member and the elongated guiding hole of the sliding bracket sequentially after the tab engages in the elongated slot of the sliding bracket.

12. The LCD device as claimed in claim 10, the sliding bracket comprises a flange defining an elongated guiding hole, the bezel comprises a fixing pin, the fixing pin of the bezel engages in the elongated guiding hole of the sliding bracket after the tab engages in the elongated slot of the sliding bracket.

13. The LCD device as claimed in claim 11, wherein the fixing plates of the sliding bracket and the fixing member respectively defines two fixing holes, the bezel comprises two fixing posts, two screws are inserted through the fixing holes of the sliding bracket and the fixing holes of the fixing member sequentially to engage in the corresponding fixing posts of the bezel, for fixing the sliding bracket to the bezel after the sliding bracket is moved to adjust the receiving space for fitting with the LCD panel.

14. A liquid crystal display (LCD) device comprising:
a bezel defining an opening;
a fixing bracket fixed to the bezel adjacent a side of the opening;
a fixing member fixed to the bezel adjacent to an opposite side of the opening;
a sliding bracket slidably attached to the fixing member to form an adjustable receiving space between the fixing bracket and the sliding bracket, each of the brackets comprising a main portion and a pair of extending portions extending perpendicularly from opposite ends of the main portion;
an LCD panel received in the space and exposed via the opening, the LCD panel being fixed to the fixing bracket and the sliding bracket and sandwiched between the main portions of the brackets in a first direction and sandwiched between the extending portions of the brackets in second direction; and
a cover attached to the bezel to cooperatively sandwiched the LCD panel therebetween in a third direction perpendicular to the first and second directions, wherein
the sliding bracket is fixed to the bezel after the LCD panel is received in the space.

15. The LCD device as claimed in claim 14, wherein an elongated slot is defined in one of the fixing member and the sliding bracket, and a tab extends from the other one of the fixing member and the sliding bracket and is slidable along the elongated slot.

16. The LCD device as claimed in claim 15, wherein the tab is slidable along the elongated slot in the first direction so that the sliding bracket is slidable relative to the fixing member in the first direction.

17. The LCD device as claimed in claim 16, wherein the fixing member comprises a fixing plate fixed to the bezel and a flange extending from an end edge of the fixing plate, the elongated slot being defined in the flange.

18. The LCD device as claimed in claim 16, wherein the tab extends from one of the extending portions of the sliding bracket.

* * * * *

UNITED STATES PATENT AND TRADEMARK OFFICE
CERTIFICATE OF CORRECTION

PATENT NO. : 7,489,501 B2
APPLICATION NO. : 11/614998
DATED : February 10, 2009
INVENTOR(S) : Lin-Yun Hong et al.

It is certified that error appears in the above-identified patent and that said Letters Patent is hereby corrected as shown below:

Title page item (54) should read MOUNTING APPARATUS FOR LCD PANEL

Signed and Sealed this

Eighth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,489,501 B2  
APPLICATION NO. : 11/614998  
DATED : February 10, 2009  
INVENTOR(S) : Lin-Yun Hong et al.

Page 1 of 1

It is certified that error appears in the above-identified patent and that said Letters Patent is hereby corrected as shown below:

Title page item (54) and Column 1, lines 1 and 2 should read MOUNTING APPARATUS FOR LCD PANEL This certificate supersedes the Certificate of Correction issued September 8, 2009.

Signed and Sealed this

Twenty-ninth Day of September, 2009

David J. Kappos  
*Director of the United States Patent and Trademark Office*